United States Patent
Fichter et al.

(10) Patent No.: US 6,683,565 B2
(45) Date of Patent: Jan. 27, 2004

(54) METHOD OF DETERMINING THE POSITION OF GEOSTATIONARY SATELLITES BY TRANSIT TIME MEASUREMENTS OF SATELLITE NAVIGATION SIGNALS

(75) Inventors: Walter Fichter, München (DE); Mark Hartrampf, Ottobrunn (DE)

(73) Assignee: Astrium GmbH, München (DE)

( * ) Notice: Subject to any disclaimer, the term of this patent is extended or adjusted under 35 U.S.C. 154(b) by 29 days.

(21) Appl. No.: 10/016,126

(22) Filed: Dec. 17, 2001

(65) Prior Publication Data

US 2002/0149514 A1 Oct. 17, 2002

(30) Foreign Application Priority Data

Dec. 16, 2000 (DE) .......................................... 100 62 951

(51) Int. Cl.[7] .............................................. H04B 7/185
(52) U.S. Cl. ................... 342/357.06; 342/356; 342/359
(58) Field of Search ................................ 342/352, 356, 342/357.01, 357.06, 359; 701/213, 215; 455/12.1, 13.2

(56) References Cited

U.S. PATENT DOCUMENTS

| | | | | |
|---|---|---|---|---|
| 5,041,833 | A | * 8/1991 | Weinberg | .................... 342/357 |
| 5,585,804 | A | * 12/1996 | Rodeffer | ...................... 342/359 |
| 5,933,100 | A | 8/1999 | Golding | |
| 5,935,196 | A | 8/1999 | Brodie et al. | |
| 6,072,430 | A | 6/2000 | Wyrwas et al. | |
| 6,078,286 | A | * 6/2000 | Gonzales et al. | ............ 342/359 |
| 6,295,023 | B1 | * 9/2001 | Bloebaum | ............... 342/357.06 |
| 6,515,617 | B1 | * 2/2003 | Demers et al. | ......... 342/357.01 |
| 6,535,801 | B1 | * 3/2003 | Geier et al. | .................... 701/13 |

FOREIGN PATENT DOCUMENTS

| | | |
|---|---|---|
| DE | 3426851 | 3/1987 |
| DE | 4335818 | 7/1995 |
| DE | 19643675 | 3/2000 |
| DE | 19907235 | 8/2000 |
| DE | 19712751 | 5/2001 |
| DE | 19720720 | 5/2001 |
| JP | 10054871 | 2/1998 |
| JP | 11109019 | 4/1999 |

OTHER PUBLICATIONS

S. Averin, "On Combined Application of GLONASS and GPS Systems In Conditions of Limited Observability of Navigation Satellites", Russian Institute of Space Device Engineering.

* cited by examiner

*Primary Examiner*—Dao Phan
(74) *Attorney, Agent, or Firm*—Crowell & Moring LLP

(57) ABSTRACT

A method of determining the position of geostationary satellites by means of signals of at least one navigation satellite. A determination is made of data concerning the transit times of the signals from the at least one navigation satellite to the geostationary satellite by a device of the geostationary satellite, and a determination is made of navigation data of the at least one navigation satellite by an independent navigation device. A determination is made of data concerning the system time of the at least one navigation satellite by an independent navigation device, and a data exchange occurs between the geostationary satellite and the navigation device in order to determine position data of the geostationary satellite from the transit times, the navigation data as well as the system time of the at least one navigation satellite.

20 Claims, 1 Drawing Sheet

METHOD OF DETERMINING THE POSITION OF GEOSTATIONARY SATELLITES BY TRANSIT TIME MEASUREMENTS OF SATELLITE NAVIGATION SIGNALS

BACKGROUND AND SUMMARY OF THE INVENTION

This application claims the priority of German Patent Document 100 62 951.2, filed Dec. 16, 2001, the disclosure of which is expressly incorporated by reference herein.

The position determination, particularly the orbit determination of geostationary satellites, normally takes place by means of antennas of one or several earth stations. If only one antenna of an earth station is used, the distance of the satellite from the antenna, the elevation angle and the azimuth angle are measured for determining the position. If two or more earth stations are used, respective distance measurements are carried out from the satellite to the antennas.

For determining the position, particularly for determining the orbit of geostationary satellites, navigation satellites may also be used. Particularly the Global Positioning System (GPS) or the equivalent GLONASS System can be used either in addition to the conventional orbit determination methods or as an alternative thereto. Such measures are known, for example, from German Patent Document DE 199 07 235 as well as from S. Averin et al. "On Combined Application of GLONASS and GPS Systems in Conditions of Limited Observability of Navigation Satellites", *ION GPS 96*, Page 187, and on. The alternative use of navigation satellites for the position determination results in a reduction of the required expenditures on the ground and thus in a reduction of costs. The additional use of navigation satellites increases the reliability when determining the position. A position determination by means of navigation satellites can in each case be implemented in a relatively simple manner. It requires only an antenna and a receiver for signals of the navigation satellites on board the satellite.

Navigation satellites, such as GPS satellites or GLONASS satellites fly at an altitude of approximately 20,000 kilometers and radiate their signals toward earth. Geostationary satellites are situated at an altitude of approximately 36,000 km, that is, above the orbits of the navigation satellites. They can therefore receive only signals from navigation satellites which are situated on the opposite side of the earth and whose signals radiate past the earth. This geometric configuration has two effects: First, the distance between the navigation satellite as a transmitter and the geostationary satellite as a receiver is very large, which results in a high free-space attenuation of the signals of the navigation satellites. Second, the signal intensity of the signals of the navigation satellites which radiate past the earth is relatively low because of the normally existing radiation characteristics of the transmitting antennas of the navigation satellites. Both effects result in a low ratio of the signal/noise power density (S/N) at the receiving antenna of geostationary satellite.

Normally, it is suggested to use a receiving antenna having a high directivity for eliminating the problem of the low S/N ratio for receiving navigation signals by geostationary satellites. Although, in principle, this results in an improved SIN following the receiving antenna, such directive antennas are relatively large, heavy and expensive. Mainly the size is problematic because, in the case of a geostationary satellite, the receiving antenna for navigation signals must be mounted on the side oriented toward the earth and a large number of useful-load components and bus components are already mounted on this side. Only small antennas are therefore practical, such as a hemispheric path antenna, which, however are unable to supply the desired improvement of the S/N ratio.

It is therefore an object of the present invention to provide a method of determining the position for geostationary satellites by means of signals of at least one navigation satellite which can still be used effectively at relatively low S/N values.

According to the invention, a method is provided of determining the position of geostationary satellites by means of signals of at least one navigation satellite, which method consists of the following steps:

A determination of data concerning the transit times of the signals from the at least one navigation satellite to the geostationary satellite by a device of the geostationary satellite;

a determination of navigation data of the at least one navigation satellite by a navigation device which is independent of the at least one navigation satellite as well as of the geostationary satellite;

a determination of data concerning the system time of the at least one navigation satellite by a navigation device which is independent of the at least one navigation satellite as well as of the geostationary satellite;

a data exchange between the geostationary satellite and the navigation device for the determination of position data of the geostationary satellite from the transit times, the navigation data as well as the system time of the at least one navigation satellite.

Empirically, the different partial processes which are conventionally used for the position determination by means of navigation satellites, make different demands on the SIN ratio of the received signals. Thus, a transit time measurement or the measuring of fractional parts of the transit time can still be effectively carried out at a lower S/N ratio than the determination of the remaining navigation data and of data concerning the system time, which are conventionally transmitted within the scope of the signals emitted by the navigation satellites. Within the scope of the present invention, it is now provided that only those partial processes are still to be carried out within the geostationary satellite for which a low SIN ratio of the received signals of at least one navigation satellite is sufficient, thus particularly only the determination of data concerning the transit times of the signals. The other partial processes are carried out by means of external navigation devices which may be situated, for example, on the earth surface or in a suitable position relative to the navigation satellite on an orbit around the earth and for which an access to navigation data and data concerning the system time of the at least one navigation satellite is more easily possible than for the geostationary satellite. In particular, this applies to navigation devices which are situated at locations at which the signals of the navigation satellites can be received with a better S/N ratio than at the location of the geostationary satellite or to navigation devices which can access navigation data and data concerning the system time of the at least one navigation satellite by means of a different type of data access.

On the basis of a data exchange between the geostationary satellite and the navigation device, a position determination can then take place for the geostationary satellite. As a result of this reduction of the part of the data which has to be determined by the geostationary satellite itself, to the pure determination of data concerning the transit time of the signals, a position determination can also still take place effectively at a low S/N ratio.

In a first further development of the invention, it is provided that a reception of signals of the at least one navigation satellite takes place by a navigation device which has at least one navigation receiver, and a determination of navigation data and data concerning the system time of the at least one navigation satellite takes place by the navigation device from the received signals. Such a method can be used for navigation devices which are situated at locations at which the signals of the navigation satellites can be received with a better S/N ratio than at the location of the geostationary satellite or for navigation devices. These locations may be on earth or in an orbit around the earth.

As an alternative, it may be provided that, by means of the navigation device, an extraction takes place of navigation data and data concerning the system time of the at least one navigation satellite in a data bank. Here, the fact is therefore that navigation data and data concerning the system time of the at least one navigation satellite is accessed by a different type of data access.

Each of the two above-mentioned further developments has the result that the knowledge of navigation data and data concerning the system time of the at least one navigation satellite are present in the navigation device, which can now be used for the position determination of the geostationary satellite. This position determination can take place either within the geostationary satellite or it can also take place within the navigation device.

Thus, it can either be provided that a transmission of the navigation data and of the data concerning the system time to the geostationary satellite takes place by means of a transmitting device which is connected with the navigation device in the sense of a data exchange, and a determination of position data of the geostationary satellite takes place on the basis of the transit time data, the navigation data as well as the data concerning the system time within the geostationary satellite.

However, as an alternative, it may also be provided that a transmission of the data concerning the transit time to the navigation device takes place by means of a transmitting device of the geostationary satellite; a determination of position data of the geostationary satellite takes place on the basis of transit time data, of the navigation data as well as the data concerning the system time within the navigation device; and a transmission of the determined position data takes place at the geostationary satellites by means of a transmitting device which is connected with the navigation device in the sense of a data exchange.

For a clear determination of the transit time data, it may—depending on the type and method of operation of the at least one navigation satellite and the signals transmitted by the latter—be necessary that a clear determination of the transit time data takes place while taking into account an estimated position of the geostationary satellite. For this purpose, for example, special estimating devices, such as Kalman filters, should therefore be provided inside the satellite, or an external estimation of the position can take place, for example, in an earth station, and the corresponding data can then be transmitted to the satellite.

The determination of the transit times can take place by any suitable method known from the prior art. Thus, it may, for example, be provided that the data concerning the transit times are determined by means of a delay lock loop (DLL).

According to the system, it may be helpful or even necessary that a transmission of data concerning the system time takes place from the navigation device to the geostationary satellite, and a determination of the transit time data takes place while taking into account the data concerning the system time. Thus, in such cases, a corresponding data exchange can or must also be provided between the navigation device and the satellite.

Other objects, advantages and novel features of the present invention will become apparent from the following detailed description of the invention when considered in conjunction with the accompanying drawings.

A special embodiment of the present invention will be explained in the following by means of FIGS. 1 and 2.

DETAILED DESCRIPTION OF THE DRAWINGS

Figure 1:
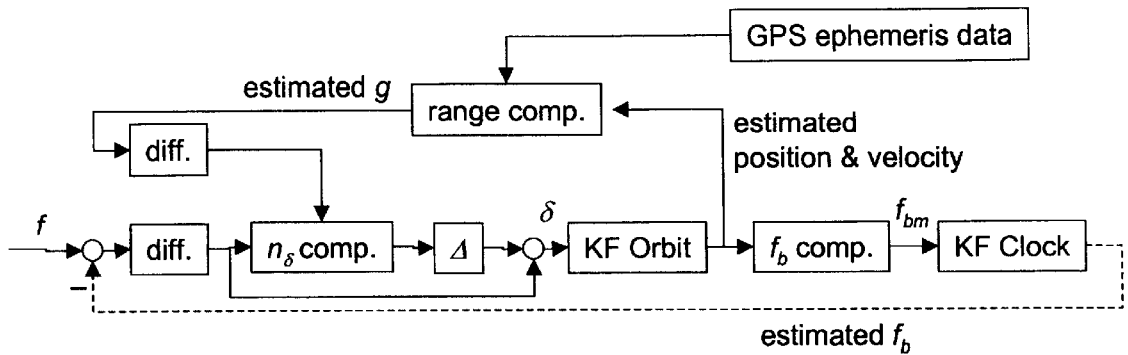
FIG. 1 is a view of a construction of an estimating filter for the position determination on the basis of differences of transit time data.

In the following, the basic principles of navigation methods will briefly be described by means of navigation satellites on the example of the GPS, and the aspects which are relevant here will be explained in greater detail. However, the invention can analogously be used also for navigation processes with other types of navigation satellites, such as GLONASS Satellites. The navigation process is used for determining the position of the geostationary satellite, which here includes the determination of the satellite orbit in a corresponding system of coordinates.

The typical navigation signal of GPS satellites—the L1 C/A code signal—consists of a carrier signal with approximately 1.5 GHz and two "data types" which are modulated onto the carrier signal. Both "data types" are required for the navigation.

So-called "navigation data". They are modulated onto the carrier signal with 50 Hz. The navigation data are decoded in a so-called "phase lock loop" (PLL).

Pseudorandom noise (PRN) sequences with a repeat duration of 1 msec, corresponding to approximately 300 km. Each GPS satellite radiates a PRN sequence assigned to it. The individual PRN sequences are mutually uncorrelated.

In the previous processes from the prior art, the navigation data are decoded by means of a "phase lock loop" (PLL) in the GPS receiver. They contain information concerning the position of the GPS satellite at the transmission time, timing marks of the GPS system time, the clock bias of the transmitting GPS satellite, integrity information, etc.

By means of a delay lock loop (DLL), so-called pseudo-orange measurements are generated from the PRN signal. A pseudo-orange measurement is a transit time measurement from the GPS satellite to the GPS receiver, but possibly encumbered with an inaccuracy which results from the clock error of the GPS receiver with respect to the GPS system time (clock bias). The clock bias therefore occurs because of a lacking synchronization of the receiver clock with the GPS system time.

The actual measurement of the pseudo-orange takes place by a phase measurement, the latter, in turn, being implemented by the correlation of the input signal with a PRN sequence generated in the receiver. However, this phase measurement is ambiguous because the PRN sequence is repeated every millisecond. The ambiguity is resolved by means of timing marks which are contained in the navigation data.

The unknown quantities within the scope of the position computation are therefore 3 positions of the receiver (in the x, y, z direction) as well as the clock bias of the receiver clock. Thus, at least 4 transit time measurements are required at a point in time in order to be able to instantaneously determine the position and the time. This approach is called a "kinematic navigation solution".

If fewer than 4 pseudo-orange measurements exist at a point in time, the position determination must be made, for example, by means of sequential estimating methods. In the case of these methods, pseudo-orange measuring data of different points in time are linked with one another by means of a movement model for the receiver. As a rule, such estimating methods operate recursively. The most widespread sequential estimating method is the so-called "Kalman filter". The approach using sequential estimating methods is often also called a "dynamic navigation solution", because a dynamic movement model is required. As a rule, the movement models contain not only orbit models but also models of the receiver clock, that is, models for the clock bias and the clock drift.

In principle, all above-described navigation processes can also be implemented "off-line", for example, in a separate device, such as an earth station. For this purpose, the occurring raw data have to be telemetered to the earth station.

A special method for the "off-line" navigation has become known by the name "MicroGPS". In this case, the GPS receiver on board the satellite is only switched on several times per orbit for a fraction of a second respectively; the raw data (bit sequences) are stored and telemetered to an earth station. Because of the short switch-on times, no timing marks of the GPS system time can be determined because they are part of the navigation data. As a result, the entire pseudo-orange cannot be determined but only the fractional part of the pseudo-orange, thus the fraction of a PRN sequence. In this case, it can, however, not be determined which one of the repetitive PRN sequences was detected; that is, the pseudo-orange measurement is ambiguous. In such a case, the ambiguity can be resolved only by a rough determination of the position, for example, by means of Doppler values.

In the geostationary orbit, under certain circumstances, fewer than 4 GPS satellites may be visible to a geostationary satellite; that is, a kinematic position determination is impossible in such cases. The navigation must then take place by means of sequential estimating methods (usually Kalman filters).

As mentioned above, the S/N ratio for the reception of signals of navigation satellites by geostationary satellites, as a rule, is relatively low. However, the S/N ratio has a considerable influence on the faultless functioning of the PLL and DLL. A defined minimal S/N ratio must be guarantied for both control circuits. This value is higher for the PLL than for the DLL.

According to the present invention, the PLL within a geostationary satellite can now be completely eliminated and the navigation can take place only by means of the raw data of the DLL. As a result, a relatively low value can be used for the minimally required S/N value, and an effective position determination can nevertheless still take place. An absent PLL first has the following technical consequences:

No more navigation data (ephemeris data, timing marks, etc.) are available within the geostationary satellite. However, the absent navigation data can instead be generated by a PLL; can be determined externally by means of one or several distributed navigation devices with GPS receivers; or can be extracted, for example, by means of a data connection to data banks, for example, via the Internet. The navigation data are therefore available in the navigation devices, for example, on the ground, and can therefore optionally also easily be commanded on board of a geostationary satellite.

Only the fractional part of the pseudo-orange measurement is still available. The measurement data are therefore ambiguous. The integer part (integral part of the pseudo-orange measurement, thus of the number of the repetitive PRN sequences) can be determined by means of an estimated position present in the geostationary satellite. Thereby the entire pseudo-orange can be reconstructed. In the case of other systems, which provide a different type of transit time measurement, a knowledge of the estimated position of the satellite may not be necessary for determining the transit time data.

For determining the position data from the data which were determined from the signals of the navigation satellite or satellites, a differentiation can be made between two different configurations:

1. Orbit Determination on the Ground

Here, either the raw data (bit sequences) or preprocessed data (fractional parts of the pseudo-orange) are telemetered from the satellite to the ground, are processed there, and a position of the geostationary satellite is determined and the thus determined position data and transmitted back to the satellite by means of telecommands. This can but must not take place in a permanent manner, but only at certain intervals in order to, for example, re-initialize an orbit model for the position of the geostationary satellite on board of the satellite.

2. Orbit Determination on Board

In this case, the relevant navigation data and data concerning the GPS system time, which were determined externally or extracted, are commanded to the satellite. The position of the geostationary satellite is then determined directly on board of the satellite.

Because of the absence of navigation data and GPS system time in the geostationary satellite, an additional external navigation device is therefore always provided in the case of the present invention. In the case of a GPS navigation solution, it is, as a rule, required that the GPS system time is known in the receiver; in the present case, therefore also in the geostationary satellite. This can take place by a regular calibration of the GPS receiver clock in the geostationary satellite from the external navigation device. In the case of the position determination on board, the relevant navigation data must also be telecommanded to the receiver, as described above. However, both activities represent no additional expenditures because, in the case of geostationary satellites, a constant data exchange is taking place anyhow, particularly with ground stations, and the transmission of the required data for the position determination can be integrated in this standardized data exchange.

In the following section, the algorithms required for the position determination will be described in detail.

Reconstruction of Pseudo-Orange Differences

A pseudo-orange p is composed of the geometric distance g and the clock bias b and can be described by $$p = g + b = n\Delta + f$$

$\Delta$ is approximately 300 kilometers, corresponding to the repetition duration of the PRN signal; n is the integral part of the measurement, that is, the sum of the integral parts of the geometric distance and of the clock bias. Correspondingly, f is the fractional part of both parts. The actual measurement consists of the determination of f; whereas n is unknown at first.

Differences of pseudo-orange are used as measurements for actualizing the Kalman filter in order to eliminate the clock model and the connected relatively high uncertainty. Such a difference measurement is known from the prior art from the initially mentioned essay by S. Averin et al.

The difference between two pseudo-oranges is:

$$\delta = p1 - p2 = (n_1 - n_2)\Delta + (f_1 - f_2) = n_\delta \Delta + (f_1 - f_2).$$

This new measured quantity □ is a function of the position of the geostationary satellite, but is independent of the clock bias. $f_1$, $f_2$ are measured values; $n_\delta$ is unknown here. If an estimated position of the satellite is available, the geometric distances $g_1$, $g_2$ between the GPS satellite and the geostationary satellite can be estimated. As a result, n□ can be computed:

$$n_\delta = \text{fix}((g_1 - g_2) - (f_1 - f2), \Delta).$$

The "fix" function rounds off to integral values, in which case the rounding off always takes place in the direction of the zero point. For example, fix(3.9, 0.5)=−7.

For computing the geometric distances $g_1$, $g_2$, in addition to the estimated position of the geostationary satellite, the position of the corresponding GPS satellite is required. The estimated position of the receiver is obtained, for example, from a once initialized Kalman filter. The GPS satellite positions are obtained by means of the known ephemeris data (part of the navigation data) and the transmission time of the GPS signals. The transmission time is estimated by means of the onboard clock calibrated to GPS system time and the median signal transit time between the GPS satellite and the geostationary satellite which is defined by the rough geometric configuration.

It should be taken into account that, when determining $n_\delta$, the value $$((g_1 - g_2) - (f_1 - f_2))/\Delta$$

in the ideal case, must result in an integer.

In the stationary, that is, steady state, of the estimation filter, the precision of the $g_1$, $g_2$ is maximally in the range of kilometers; the error of the fractional parts $f_1$, $f_2$ is in the range of meters. The integral value n. can then also be determined with the corresponding precision. If the estimated value n. exceeds or falls below an integer by more than the corresponding, above-mentioned uncertainties, it may be provided that this value is declared to be incorrect and the pertaining "measurement" □ is not used for actualizing the Kalman filter.

In the non-stationary state of the Kalman filter, for example, in the case of a very inaccurate initialization of an orbit model of the geostationary satellite, it may happen that errors of $g_1$, $g_2$ become correspondingly inaccurate. Although, in principle, this may have the result that incorrect values n. are determined, when correctly designed, the Kalman filter will operate sufficiently robustly; that is, the estimated position, despite these uncertainties, converges to the true value. This was confirmed by numerous simulations.

If the integral value no is correctly determined, the difference of the pseudo-orange δ can easily be reconstructed. The Kalman filter will then be actualized in the conventional manner by means of the measurement quantity δ which is only a function of orbit data but not of clock data.

It should also be pointed out that, for using pseudo-orange differences, the signals of two or more GPS satellites must be received simultaneously. In the case of the method according to the invention, this is facilitated by the fact that the S/N threshold for the signal reception is relatively low, which increases the visibility of GPS satellites.

FIG. 1 shows the basic construction of an estimation filter when pseudo-orange differences are used as measured quantities. The GPS ephemeris data are supplied by the external navigation device. The abbreviation comp. in each case indicates a computation of the corresponding value according to the above-mentioned computation directions; diff. indicates a difference formation of the corresponding values corresponding to the above-mentioned computation directions.

The estimation filters KF orbit for the position or orbit and KF clock for the clock of the geostationary satellite are not mutually coupled. The return of estimated values for the clock fraction of the fractional part $f_b$ indicated by a broken line, because of the difference formation, is not necessary for this case. The broken line indicates only that here the same structure is present as in the case of the direct use of pseudo-oranges as measured quantities, as will be explained later by means of FIG. 2. The output-side Kalman filter for the receiver clock estimates only the fractional part of the receiver clock but not the entire clock bias.

Thus, for this case, the computation of $f_b$ as well as the Kalman filter KF clock of the clock of the satellite is not absolutely required for a correct functioning of the position filter KF orbit, because differences of pseudo-oranges—and not pseudo-oranges themselves—are used as the measured quantity. In the case of n measured GPS signals, the value of the fractional parts is determined according to the direction $$e_{fb} = \frac{1}{n} \sum_{1}^{n} f_i - f_{gi}$$

wherein the $f_{g1}$ are computed by means of the estimated position of the position filter KF orbit.

Figure 2:
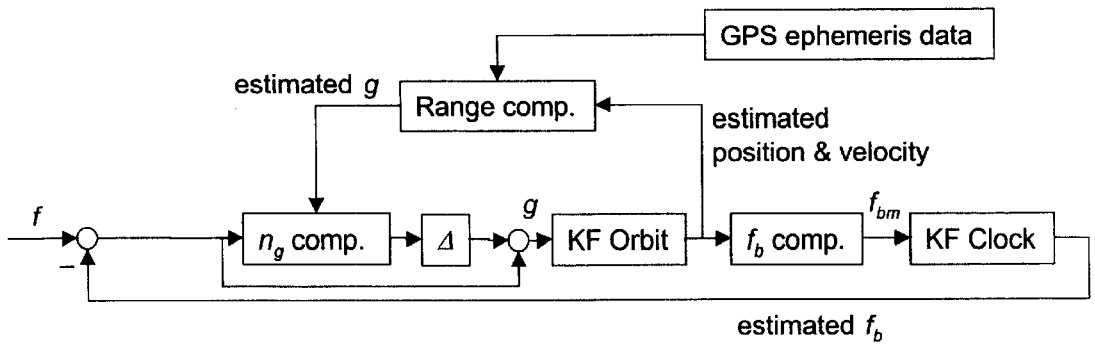
FIG. 2 is a view of the construction an estimating filter for the position determination on the basis of transit time data.

If, however, on the other hand, more than one GPS satellite is simultaneously visible not sufficiently often, pseudo-oranges themselves will expediently be used as a measured value for actualizing the Kalman filter. The measures required for this purpose are illustrated in FIG. 2. The construction of the entire estimation filter is basically identical with the estimation filter of FIG. 1, but the two difference formations are absent. In addition, the return of the estimated fractional parts $f_b$ of the clock is obligatory; that is, the position filter KF orbit and the clock filter KF clock are not longer independent of one another.

In the sequence according to FIG. 2, the measured fractional part of the pseudo-orange f is cleared of the clock fraction $f_b$. The fractional part of the geometric distance $f_g$ remains $$f_g = f - f_b$$

By means of this information, the geometric distance g is reconstructed analogously to the approach in the case of differences of pseudo-orange measurements, specifically by means of the estimated geometric distance g (estimated g). The reconstructed geometric distance is then used for actualizing the position filter KF orbit. Thus, in this case, the information concerning $f_b$ is necessary for the process. This information is obtained from the clock filter KF clock which is connected behind the position filter KF orbit. Thus, in this case, the position filter KF orbit is not longer independent of the clock filter KF clock.

Summarizing, the present special example for a position determination with the GPS demonstrates the special characteristic that only a code correlation is carried out within the scope of a DLL but no phase control circuit (PLL phase lock loop) is provided. The time of the satellite is regularly calibrated to GPS system time; in the process, the navigation data and the data concerning the GPS system time are provided by an external source—the external navigation device. The actual measurement data or raw data of the process, from the view of the satellite, consist only of fractional parts of the pseudo-orange measurements. The integral parts of the pseudo-orange differences or pseudo-oranges can be reconstructed by means of the estimated satellite position. The position determination takes place by means of an estimation filter with the functionalities of a Kalman filter, consisting of a position filter and a clock filter which are each themselves constructed as a Kalman filter. For actualizing the Kalman filter KF orbit for the position, differences of pseudo-orange measurements are used. In this case, knowledge of the condition of the clock of the satellite is not required. When the visibility of the navigation satellites is very poor, reconstructed pseudo-oranges themselves can also be used for actualizing the Kalman filter KF orbit. However, this absolutely requires a clock filter KF clock.

The advantages of this method are that a phase lock loop (PLL) is no longer required in the board-side GPS receiver onboard the satellite, and, because of the no longer required PLL, signals can be used which have a lower S/N ratio. Thus, for the signal tracking of the relatively weak signals, standardized patch antennas can be used. Patch antennas are relatively small, light and inexpensive. This eliminates the system-related problem of the housing of large receiving antennas with radiation patterns on the satellite.

The determination of the position of the satellite can take place either within the external navigation device, for example, on earth. Raw data (bit data flow) or preprocessed data (fractional parts) are then telemetered to the external device. The analysis takes place in the external device. The position data (for example, orbit parameters or equivalent values) are commanded to the geostationary satellite. However, a position determination can also take place onboard the satellite. The navigation data etc. are then commanded to the satellite. The analyzing of the data takes place onboard the satellite in the GPS receiver or in another onboard computer. The position data (for example, orbit parameters or equivalent values) can be telemetered for control purposes to the external navigation device, for example, a ground station on earth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining the position of geostationary satellites by means of signals of at least one navigation satellite, comprising the steps of:

determining data concerning the transit times of the signals from the at least one navigation satellite to the geostationary satellite by a device of the geostationary satellite, determining navigation data of the at least one navigation satellite by a navigation device which is independent of the at least one navigation satellite as well as of the geostationary satellite, determining data concerning the system time of the at least one navigation satellite by a navigation device which is independent of the at least one navigation satellite as well as of the geostationary satellite, providing data exchange of the navigation and the data concerning the system time or of the data concerning the transit times between the geostationary satellite and the navigation device; and determining position data of the geostationary satellite from the transit times, the navigation data as well as the system time of the at least one navigation satellite within the geosynchronous satellite or within the navigation device.

2. The method according to claim 1, further comprising the steps of:

receiving signals of the at least one navigation satellite by a navigation device which has at least one navigation receiver, and by means of the navigation device,
determining the navigation data and data concerning the system time of the at least one navigation satellite from the received signals.

3. The method according to claim 1, further comprising the steps of:

extracting navigation data and data concerning the system time of the at least one navigation satellite in a data bank by means of the navigation device.

4. The method according to claim 2, further comprising the steps of:

transmitting the navigation data and of the data concerning the system time to the geostationary satellites by means of a transit device which is connected with the navigation device in the sense of a data exchange, and
determining position data of the geostationary satellite on the basis of the transit time data, the navigation data as well as the data concerning the system time within the geostationary satellite.

5. The method according to claim 2, further comprising the steps of:

transmitting the data concerning the transit time to the navigation device by means of a transit device of the geostationary satellite,
determining position data of the geostationary satellite on the basis of the transit time data, the navigation data as well as the data concerning the system time within the navigation device, and
transmitting the determined position data to the geostationary satellite takes place by means of a transit device, which is connected, with the navigation device in the sense of a data exchange.

6. The method according to claim 1, further comprising the step of unambiguously determining the transit time data while taking into account an estimated position of the geostationary satellite.

7. The method according to claim 1, further comprising the step of determining date concerning the transit times by means of a delay lock loop (DLL).

8. The method according to claim 1, further comprising the steps of:

transmitting data concerning the system time from the navigation device to the geostationary satellite, and
determining the transit time data while taking into account the data concerning the system time.

9. The method according to claim 3, further comprising the steps of:

transmitting the navigation data and of the data concerning the system time to the geostationary satellites by means of a transit device which is connected with the navigation device in the sense of a data exchange, and determining position data of the geostationary satellite on the basis of the transit time data, the navigation data as well as the data concerning the system time within the geostationary satellite.

10. The method according to claim 3, further comprising the steps of:

transmitting the data concerning the transit time to the navigation device by means of a transit device of the geostationary satellite, determining position data of the geostationary satellite on the basis of the transit time data, the navigation data as well as the data concerning the system time within the navigation device, and transmitting the determined position data to the geostationary satellite takes place by means of a transit device, which is connected, with the navigation device in the sense of a data exchange.

11. The method according to claim 2, further comprising the steps of unambiguously determining the transit time data while taking into account an estimated position of the geostationary satellite.

12. The method according to claim 3, further comprising the steps of unambiguously determining the transit time data while taking into account an estimated position of the geostationary satellite.

13. The method according to claim 4, further comprising the steps of unambiguously determining the transit time data while taking into account an estimated position of the geostationary satellite.

14. The method according to claim 5, further comprising the steps of unambiguously determining the transit time data while taking into account an estimated position of the geostationary satellite.

15. The method according to claim 2, further comprising the steps of determining date concerning the transit times by means of a delay lock loop (DLL).

16. The method according to claim 3, further comprising the steps of determining date concerning the transit times by means of a delay lock loop (DLL).

17. The method according to claim 4, further comprising the steps of determining date concerning the transit times by means of a delay lock loop (DLL).

18. The method according to claim 6, further comprising the steps of determining date concerning the transit times by means of a delay lock loop (DLL).

19. The method according to claim 2, further comprising the steps of:

transmitting data concerning the system time from the navigation device to the geostationary satellite, and determining the transit time data while taking into account the data concerning the system time.

20. The method according to claim 3, further comprising the steps of:

transmitting data concerning the system time from the navigation device to the geostationary satellite, and determining the transit time data while taking into account the data concerning the system time.

* * * * *